United States Patent

[11] 3,621,451

[72] Inventors Giichi Yokoyama;
Yoshihisa Kameoka, both of Tokyo, Japan
[21] Appl. No. 11,662
[22] Filed Feb. 16, 1970
[45] Patented Nov. 16, 1971
[73] Assignee Hewlett-Packard Company
Palo Alto, Calif.
[32] Priority Feb. 26, 1969
[33] Japan
[31] 44/13934

[54] FREQUENCY MULTIPLIER
3 Claims, 1 Drawing Fig.

[52] U.S. Cl. .......... 331/11, 331/10, 331/18
[51] Int. Cl. .......... H03b 3/06
[50] Field of Search .......... 331/11, 18, 25, 10

[56] References Cited

UNITED STATES PATENTS

| | | | |
|---|---|---|---|
| 3,087,121 | 4/1963 | Bell .......... | 331/11 |
| 3,297,964 | 1/1967 | Hamilton .......... | 331/11 |

*Primary Examiner*—John Kominski
*Attorney*—A. C. Smith

ABSTRACT: A frequency-multiplying device multiplies frequencies of input signals by $N$ ($N$ being a positive integer). The multiplying device can feed multiplied signal frequencies into an electronic counter for counting low frequency input frequencies quickly with high accuracy.

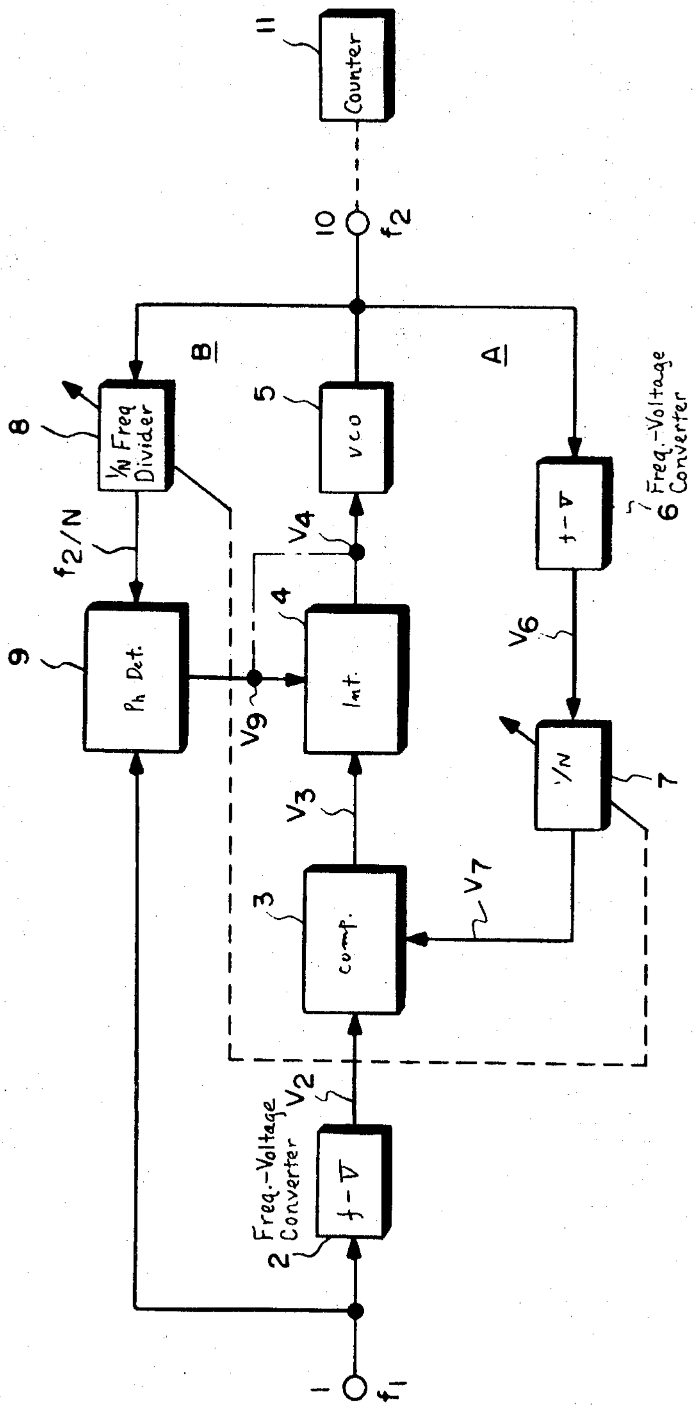
Counter
11
10
$f_2$
B
A
5
VCO
8
1/N Freq Divider
$f_2/N$
9
Ph Det.
$V_9$
$V_4$
4
Int.
$V_3$
3
comp.
$V_7$
1/N
7
$V_6$
f-V
6 Freq.-Voltage Converter
$V_2$
f-V
2 Freq.-Voltage Converter
1
$f_1$

FREQUENCY MULTIPLIER

DESCRIPTION OF THE DRAWING AND PREFERRED EMBODIMENT

The drawing is a block diagram of a preferred embodiment of the multiplying device of this invention. In the diagram, 1 indicates the input terminal where an electric signal whose frequency is $f_1$ is impressed, 2 indicates the first frequency-voltage converter which obtains a DC voltage $V_2$ proportional to frequency $f_1$ of the input signal, and 3 denotes a comparator equipped with two input terminals and one output terminal. The output voltage $V_2$ from said converter 2 is applied on the one input terminal of the comparator 3 and a feedback voltage $V_7$ (provided as described below) is applied to the other input terminal. The integrator 4 integrates the differential voltage $V_3$ between the two voltages $V_2$ and $V_7$ applied to the comparator 3. Numeral 5 is a voltage-controlled variable frequency oscillator whose output frequency $f_2$ is controlled by the magnitude of the output voltage $V_4$ of the integrator 4. Numeral 6 is the frequency-voltage converter for obtaining a DC voltage $V_6$ proportional to the output frequency $f_2$. Numeral 7 is a voltage divider which divides said voltage $V_6$ into $1/N$, and impresses the divided voltage $V_7$ on the other input terminal of said comparator 3. Thus an automatic frequency-control circuit A is composed of a closed-loop circuit including comparator 3, integrator 4, variable oscillator 5, second frequency-voltage converter 6 and voltage divider 7 and the first frequency-voltage converter 2. This circuit controls the signal frequency $f_2$ obtained at the output terminal 10 at a value extremely close to a value $N$ times the said input frequency $f_1$. Numeral 8 is a frequency divider which divides the output signal frequency $f_2$ accurately to $1/N$. The phase-difference detector 9 has two input terminals and one output terminal. One of the input terminals receives the output signal ($f_2/N$) of the frequency divider, and the other of the input terminals receives the signal ($f_1$) which is applied to the input terminal 1. Thus an output voltage $V_9$ corresponding to the phase difference between the two signals is fed into the other input of the integrator 4. As a consequence, the variable oscillator 5 which is controlled by output voltage $V_4$ from the integrator 4 will be controlled by two voltages $V_3$ and $V_9$. Thus phase-control circuit B is formed by means of a closed-loop circuit composed of integrator 4, variable oscillator 5, frequency divider 8 and phase-difference detector 9. A conventional counter 11 is connected to the output terminal 10.

The detailed functions of the multiplying device of the present invention are analyzed below. Voltages $V_2$, $V_7$ fed into each input end of comparator 3 may be expressed in formulas as follows:

$$V_2=K_1f_1\ldots \qquad (1)$$

$$V_7=V_6/N\ldots \qquad (2)$$

Also, as $V_6=K_2f_2$, above-mentioned formula (2) may be replaced by the following formula (3):

$$V_7=K_2f_2/N\ldots \qquad (3)$$

Here, above-mentioned $K_1$, $K_3$ are proportional constants determined by converters 2 and 6 respectively, so that, assuming that $K_1=K_2=K$, output voltage $V_3$ of comparator 3 may be expressed by the following formula (4) in reference to the following formulas (1) and (3):

$$V_3=V_3-V_7=(Nf_1-f_2)K/N\ldots \qquad (4)$$

Consequently, when the output frequency $f_2$ is $N$ times the input frequency $f_1$, said $V_3$ will become 0. Here, if $f_2$ is lower than $Nf_1$, the value of $V_3$ will become positive and since the voltage is impressed on integrator 4 which integrates same, as long as voltage $V_3$ exists, the integrated output voltage 4 continues to rise and output frequency $f_2$ of variable oscillator 5 will keep on shifting to higher values. When $f_2$ becomes equal to $Nf_1$, voltage $V_3$ becomes 0, the integrator 4 holds the integrated output $V_4$, and the automatic frequency-control circuit A including said variable oscillator will maintain a relation of $f_2=Nf_1$.

In the automatic frequency-control circuit A described above, slight errors may occur between the two signal frequencies, although, being an analog control circuit, $f_2$ would be maintained at a value very close to that of $Nf_1$. In order to completely remove this error, a phase-control circuit B, which shall be described later, is added to the device of this invention. In other words, the signal of output frequency $f_2$ of variable oscillator 5 is divided into $1/N$ by the divider 8. This divider 8 does not introduce error through the frequency division where conventional system is used which generates a pulse signal at each of $N$ cycles of the input AC signal. The signal frequency $f_2/N$ thus divided is applied to one input end of the phase-difference detector 9. The other input of said detector 9 receives the signal frequency $f_1$ impressed on input terminal 1. Here, if $f_2/N$ and $f_1$ are nearly equal but slightly different due to the automatic frequency-control circuit A, the phases of these two inputs would change with time. Consequently, as a phase difference occurs between the two inputs, a DC voltage $V_9$ which corresponds to this phase difference is impressed on the other input of integrator 4 from phase-difference detector 9. As a result, the output voltage $V_4$ from the integrator 4 continues to change as long as voltage $V_9$ is in existence, and is controlled in the direction to establish the phase difference at 0° (or, optionally, 90°). Thus, if the phase difference between the two inputs of the phase-difference detector 9 becomes 0 (or of a constant phase difference), the output frequency $f_2$ of the variable oscillator 5 will be accurately $N$ times the input frequency $f_1$ and will be kept so by the phase-locked loop thus formed.

The operations of the foregoing respective control circuits A, B are further described below. Assuming that the output frequency $f_2$ first controlled by the automatic frequency-control circuit A is slightly lower than $N$ times the input frequency $f_1$, the phase-difference detector 9 will generate output voltage $V_9$ which will cause the output voltage $V_4$ of integrator 4 to rise and thereby raise the output frequency slightly. Therefore a negative voltage $V_3$ is brought out at the output end of comparator 3. Actually, however, the two control circuits A, B will both be balanced at a point where the positive voltage $V_9$ and a negative voltage $V_3$ becomes equal. As a result, there occurs a constant phase difference between the two input signals impressed on the phase-difference detector 9. As the phase difference will not vary, the output frequency $f_2$ will be maintained accurately at $N$ times the input frequency $f_1$, as stated above. The response speed of the phase-control circuit B may be improved by applying the output voltage $V_9$ of the phase-difference detector 9 into the integrator 4 and at the same time applying it directly to the input end of the variable oscillator 5, as shown by the broken line path.

As detailed above, the device of the present invention includes an automatic frequency-control circuit and a phase-control circuit oscillator simultaneously controlling the variable oscillator by two control loops. Thus, by stepping up the input frequencies accurately $N$ times, the device of this invention may be coupled with a conventional electronic counter for accurately counting comparatively low frequency signals in a short time.

In another embodiment of this present invention if one of the first and the second frequency-voltage converter generates a DC voltage inversely proportional to the input frequency the voltage divider 7 inserted in the latter stage of the second converter 6 may be removed and instead said voltage divider may be inserted in the latter stage of the first converter 2.

We claim:

1. Apparatus for increasing the frequency of an applied signal by an integer $N$, the apparatus comprising:
   - first converter means connected for receiving an applied signal to produce a first output signal having an amplitude proportional to the frequency of an applied signal;
   - comparator means having an input connected to receive the first output signal from said first converter and having another input and an output;
   - an integrator having input means connected to the output of the comparator means;

signal-controlled oscillator means connected to receive the output of said integrator for producing an output frequency representative of the control signal applied thereto from said integrator;

second converter means connected to receive the output frequency from said oscillator means for applying to said other input of said comparator means a second output signal having an amplitude proportional to $1/N$ times the output frequency of said oscillator means where $N$ is an integer greater than unity;

phase-detecting means having an input connected to receive the applied signal and having another input connected to receive the output frequency from the oscillator means for producing an output representative of the phase relationship between the signals applied to to the inputs thereof; and circuit means for applying the output from said phase-detecting means to the input means of said integrator for producing at the input of said oscillator means connected to the output of said integrator a control signal indicative of the integral of the signals applied to the input means of said integrator.

2. Apparatus as in claim 1 wherein:

said circuit means also applies the output from said phase-detecting means to said oscillator means for controlling the frequency thereof in response to the combination of signals applied thereto from said phase-detecting means and integrator.

3. Apparatus as in claim 1 wherein:

said phase-detecting means includes a phase detector having inputs and a frequency divider connected to receive the output frequency from said oscillator means for applying to one input of said phase detector a signal frequency proportional to $1/N$ times the signal frequency of said oscillator means; and means connected to apply the applied signal to another input of said phase detector.

* * * * *